United States Patent [19]

Meredith

[11] Patent Number: 4,722,495
[45] Date of Patent: Feb. 2, 1988

[54] RETRACTOR WEBBING BRAKE

[75] Inventor: Anthony C. Meredith, Sellicks Beach, Australia

[73] Assignee: Rainsfords Metal Products Pty Limited, South Australia, Australia

[21] Appl. No.: 17,494

[22] Filed: Feb. 24, 1987

[30] Foreign Application Priority Data

Feb. 21, 1986 [AU] Australia .............................. PH4728

[51] Int. Cl.[4] ............................................. B60R 22/38
[52] U.S. Cl. .............................. 242/107.2; 242/107.3; 242/107.4 B
[58] Field of Search ........... 242/107.2, 107.3, 107.4 B, 242/107.4 A; 280/806, 807, 808; 297/475–478

[56] References Cited

U.S. PATENT DOCUMENTS

| 3,504,867 | 4/1970 | Stevenson | 242/107.2 |
| 3,817,473 | 6/1974 | Board et al. | 242/107.2 |
| 4,293,105 | 10/1981 | Weman | 242/107.4 B |
| 4,418,878 | 12/1983 | Fohl | 242/107.3 |

Primary Examiner—John M. Jillions
Attorney, Agent, or Firm—Popper, Bobis & Jackson

[57] ABSTRACT

A webbing brake is coupled to the retractor frame and has a hinged brake member with a finger which rides the outer convolution of the seat belt on the spool, the brake member having a portion which, as the spool fills with webbing, becomes so inclined that it frictionally engages a face of the seat belt and restrains its rate of retraction onto the spool.

5 Claims, 3 Drawing Figures

RETRACTOR WEBBING BRAKE

This invention relates to a brake arrangement for braking the retraction rate of webbing in a seat belt retractor of the type which has a retractor frame, a spool journalled for rotation in the retractor frame, and a retractor spring co-acting between the spool and retractor frame for retracting a seat belt onto the spool.

BACKGROUND OF THE INVENTION

On both single sensitive and multiple sensitive retractors for seat belts, webbing sensing usually includes one mode wherein a flywheel's inertia is sensed such that the webbing may be locked against withdrawal by acceleration rather than by velocity. (See, for example, U.S. Pat. No. 3,552,676 WEBER, New Zealand Pat. No. 148,694 BRITAX, both typical of such retractors). This "inertial sensing" operates irrespective of the direction of travel of the reel and irrespective of the direction of webbing travel. Therefore locking will be induced when acceleration of the webbing is increased beyond the sensing level, not only as the webbing is withdrawn from the retractor but also when the webbing accelerates beyond the sensing level as it is retracted back onto the reel.

If the webbing during retraction onto the reel suddenly stops, due to a component on the webbing (for example a buckle part) preventing further movement, a high negative acceleration is sensed and the locking mechanism is operated. Inertia in the total system together with the rewind spring load will stretch the webbing or tighten it onto the spool, and there would be a tendency for the reel to rebound to release the belt tension. However since the locking mechanism is actuated before this can happen, the retractor will be locked, and this will prevent the webbing from being withdrawn. There are therefore occasions when the webbing may be retracted onto the retractor spool at such a rate that when all the webbing is on the reel, the retractor locks, and the webbing becomes jammed in such a way that the seat belt becomes unusable unless some force is applied to the webbing to push it back onto the reel and thereby release tension, but this can only happen when the belt is withdrawn by closing its convolutions on the reel, and then relaxed. However this manoeuvre is not normally understood by users, and the seat belt can be regarded as being unusable.

The main object of this invention is to provide means whereby the rate of retraction is such that it is unlikely for the webbing to jam onto the reel.

BRIEF SUMMARY OF THE INVENTION

In an embodiment of the invention a webbing brake is coupled to the retractor frame and has a hinged brake member with a finger which rides the outer convolution of the seat belt on the spool, the brake member having a portion which, as the spool fills with webbing, becomes so inclined that it frictionally engages a face of the seat belt and restrains its rate of retraction onto the spool.

Even when a brake of this type is incorporated, there is a remaining slight possibility of malfunction under extreme conditions, and in another aspect of the invention the finger which rides over the periphery of the webbing on the spool, abuts a stop as the spool fills with webbing, and thereby applies a positive braking onto the spool inhibiting, or reducing the speed of the retraction rotation.

BRIEF DESCRIPTION OF THE DRAWINGS

An embodiment of the invention is described hereunder in some detail with reference to and is illustrated in the accompanying diagrammatic drawings, in which.

DETAILED DESCRIPTION OF THE PREFERRED EMBODIMENT

Figures 1, 2, 3:
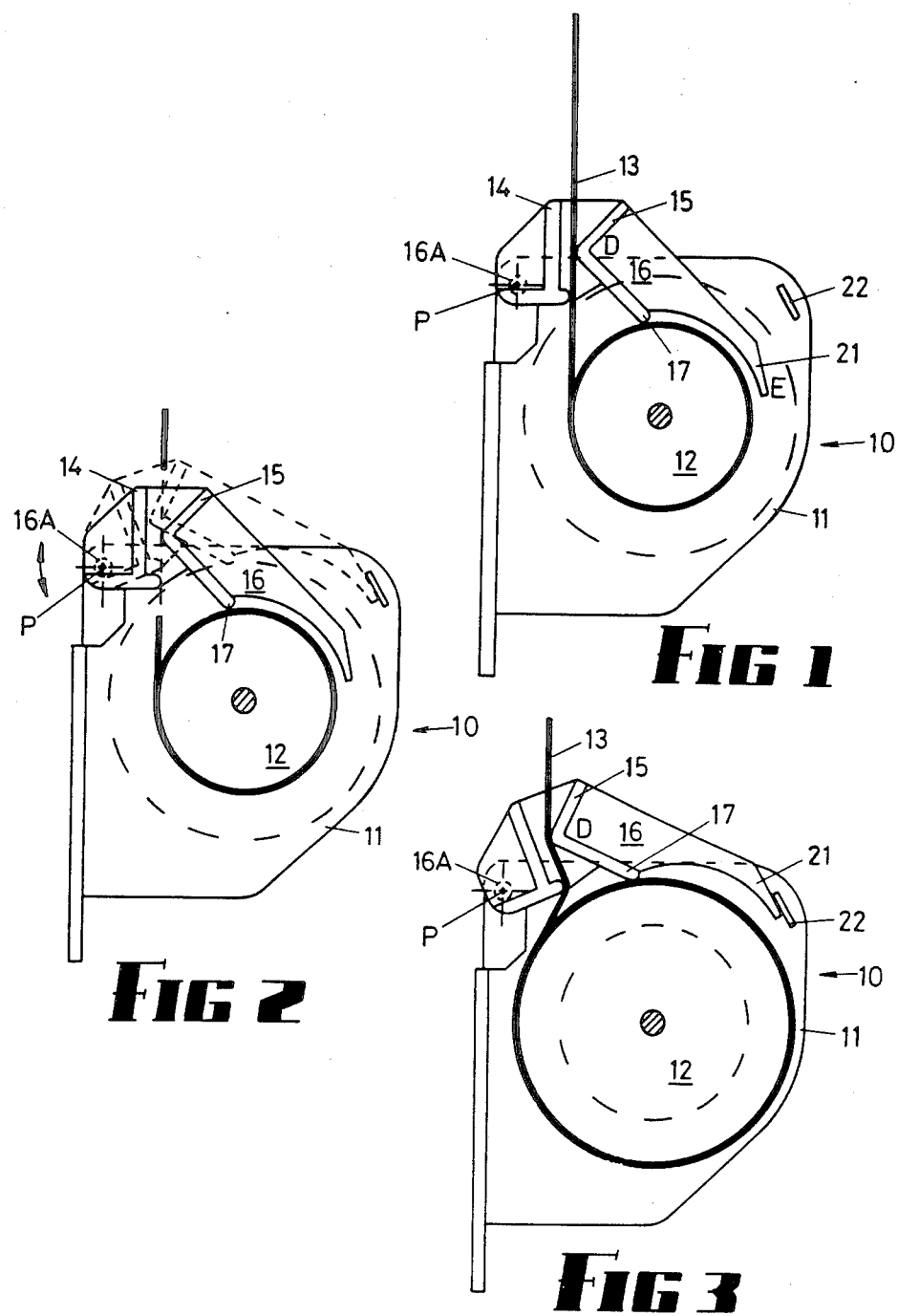
FIG. 1 shows the condition which exists when all webbing is extended and the spool is empty of webbing.
FIG. 2 shows the spool without webbing, with the hinged brake element shown in full line drawing for empty spool condition and in dotted line drawing for full spool condition.
FIG. 3 shows the way in which, as full spool condition is approached, the retraction of the webbing onto the spool is restrained.

In this embodiment, a spool retractor 10 comprises a frame 11 which is constructed according to well known principles, and the frame 11 has journalled to it a spool 12 which is associated with a retraction spring (not shown) and an inertial sensing device (also not shown). The spool 12 carries on it seat belt webbing 13, and this webbing passes between two portions 14 and 15 of a hinged brake member 16 which is hinged about the pivot axis P of a pivot pin 16A. The hinged brake element 16 is arranged so that when the spool is empty as in FIG. 1, there is no restraint or pressure against the webbing 13 which passes directly between portions 14 and 15 and is readily retracted onto the spool 12. However as webbing 13 builds up its convolutions on spool 12, a sensing finger 17 senses the increase of the thickness of the webbing convolutions lying on the spool 12 and thereby tilts the hinged brake element 16 about its hinge point P. When this occurs, as seen in FIG. 3, the seat belt webbing 13 which passes between the portions 14 and 15 of the element 16 which becomes so misaligned that the webbing strap 13 becomes distorted and opposite surfaces thereof slide over portions 14 and 15, and the friction imparted thereby restrains the flow of webbing back onto the spool 12. As the spool becomes more nearly full, the sensing finger 17 is urged out by the webbing 13 on the filling spool 12 until the stop finger 21 engages the stop 22 on the frame 11. This imparts pressure by the sensor finger on the outer belt convolution on the spool, and greatly increases the degree of restraint acting as a mechanical brake on the webbing itself, and therefore even if there is a malfunction of the first stage of braking of the webbing, the second stage will further induce braking more rapidly, and then even if there is a malfunction, the seat belt can still be extracted from the spool with greater ease than if it were locked and jammed in position without the benefit of this very simple device.

The claims defining the invention are as follows:
I claim:

1. In a seat belt retractor having a retractor frame, a spool journalled for rotation in the retractor frame, a retractor spring co-acting between the spool and retractor frame for retracting a seat belt onto the spool,
   a brake comprising a brake member, pivot means pivoting the brake member to the retractor frame, a sensing finger on the brake member riding the outer convolution of the seat belt on the spool, the brake member comprising a portion which, upon increase of the convolutions on the spool and consequential tilting of the brake member, frictionally engages one face of the seat belt and restrains its rate of retraction onto the spool.

2. A brake according to claim 1 wherein said brake member comprises a second portion which, upon increase of the convolutions and consequential tilting of the brake member, engages a second face of the seat belt and further restrains its rate of retraction onto the spool.

3. A brake according to claim 2 wherein said brake member portions are spaced from each other and said seat belt webbing 13 passes directly between those portions and onto the spool until said sensing finger tilts said brake member upon increase of convolutions on the spool, whereupon engagement of said brake member portions against opposite faces of the seat belt webbing distorts the webbing.

4. A brake according to claim 1 or claim 2 wherein said frame comprises a stop and said brake member comprises a stop finger engageable against the stop as said sensing finger tilts said brake member upon increase of said convolutions as the seat belt retracts onto the spool.

5. A brake according to claim 4 wherein said engagement of the stop finger against the stop inhibits movement of the sensing finger away from the spool so that the sensing finger imparts a braking action against said outer convolution of the seat belt on the spool.

* * * * *